United States Patent [19]

Mihailovski et al.

[11] 3,816,091
[45] June 11, 1974

[54] HERBICIDAL ARYL ACETYLENE ETHERS

[76] Inventors: Alexander Mihailovski, 1812 Delaware St., Berkeley, Calif. 91504; Ferenc M. Pallos, 3027 Vessing Rd., Pleasant Hill, Calif. 94523

[22] Filed: Dec. 8, 1972

[21] Appl. No.: 313,376

Related U.S. Application Data

[62] Division of Ser. No. 90,064, Nov. 16, 1970.

[52] U.S. Cl. .................................... 71/124, 71/70
[51] Int. Cl. ................................................ A01 9/24
[58] Field of Search ...................................... 71/124

[56] References Cited
UNITED STATES PATENTS

| 2,897,241 | 7/1959 | Watson | 71/124 X |
| 3,131,166 | 4/1964 | Harris et al. | 71/124 X |
| 3,340,308 | 9/1967 | Sterling et al. | 71/124 X |

Primary Examiner—Lewis Gotts
Assistant Examiner—Catherine L. Mills
Attorney, Agent, or Firm—Daniel C. Block

[57] ABSTRACT

New compounds represented by the following generic formula:

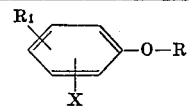

wherein R can be alkynyl; $R_1$ can be alkynoxy; X can be selected from the group consisting of hydrogen, alkyl, alkynoxy or halogen.

9 Claims, No Drawings

HERBICIDAL ARYL ACETYLENE ETHERS

This is a division of U.S. Pat. application Ser. No. 90,064, filed Nov. 16, 1970.

DESCRIPTION OF THE INVENTION

This invention is directed to a novel group of compounds which may be generically described as aryl acetylenes which are active herbicides. The compounds of the present invention are represented by the general formula:

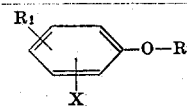

wherein R can be alkynyl; $R_1$ can be alkynoxy; X can be selected from the group consisting of hydrogen, alkyl, alkynoxy or halogen.

The above-noted compounds can be prepared by treating a substituted phenol or polyhydroxy benzene with a propargyl halide in an inert solvent such as acetone, using approximately a mole equivalent of a base as an acid acceptor such as potassium carbonate.

In order to illustrate the merits of this invention the following examples are provided:

EXAMPLE 1

1,4-bis-(2'-Butynoxy)benzene

A mixture of 10.0 g. (0.047 moles) hydroquinone, 45 ml. methanol, 8.7 g. (0.098 moles) 1-chloro-2-butyne and 20.3 g. of 25 percent sodium methoxide in methanol (equivalent to 0.094 moles sodium methoxide) was purged with a stream of argon gas and then refluxed for four hours. The solvent was evaporated. The residue was dissolved in 50 ml. ethyl ether and then washed with 5 percent sodium hydroxide and water. After drying, the ether solution was concentrated and cooled to give 3.7 g. of crystalline product; m.p. 76.5°–78.5° C. Yield, 37 percent of theory.

EXAMPLE 2

2,4-bis-(2'-Propynoxy)bromobenzene

To a solution of 10.0 g. (0.053 moles) 4-bromoresorcinol in 50 ml. acetone which had been purged with argon gas were added 16.1 g. (0.116 moles) anhydrous potassium carbonate and 13.9 g. (0.116 moles) propargyl bromide dissolved in 25 ml. acetone. The resulting mixture was refluxed with vigorous stirring for 18 hours, then filtered and the solvent evaporated. The residue was dissolved in ethyl ether and the other solution was washed with 5% sodium hydroxide. After drying the ether fraction with anhydrous magnesium sulfate, the solvent was evaporated to give a solid product which was recrystallized from petroleum ether/benzene. Some 6.9 g. of crystalline material were obtained; m.p. 61°–63° C. Yield, 49 percent of theory. Structural proof followed from infrared and proton magnetic resonance spectroscopy.

Other compounds were prepared in an analogous manner starting with the appropriate reagents as outlined above. The following is a table of compounds representative of those embodied by the present invention. Compound numbers have been assigned to them and are used for identification throughout the balance of the specification.

TABLE I

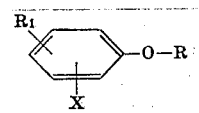

| Compound No. | R | $R_1$ | X |
|---|---|---|---|
| 1 | $CH_2C \equiv CCH_3$ | $4\text{-}OCH_2C \equiv CCH_3$ | H |
| 2 | $CH_2C \equiv CH$ | $4\text{-}OCH_2C \equiv CH$ | $2,3,5\text{-}CH_3$ |
| 3 | $CH_2C \equiv CH$ | $2\text{-}OCH_2C \equiv CH$ | $3\text{-}OCH_2C \equiv CH$ |
| 4 | $CH_2C \equiv CH$ | $3\text{-}OCH_2C \equiv CH$ | 4-Cl |
| 5 | $CH_2C \equiv CH$ | $3\text{-}OCH_2C \equiv CH$ | $2\text{-}CH_3$ |
| 6 | $CH_2C \equiv CH$ | $4\text{-}OCH_2C \equiv CH$ | 2-Cl |
| 7 | $CH_2C \equiv CH$ | $4\text{-}OCH_2C \equiv CH$ | 2-Br |
| 8 | $CH_2C \equiv CH$ | $3\text{-}OCH_2C \equiv CH$ | 4-Br |

HERBICIDAL SCREENING TESTS

As previously mentioned, the novel compounds herein described are phytotoxic compounds which are useful and valuable in controlling various plant species. Compounds of this invention are tested as herbicides in the following manner.

Pre-Emergence Herbicide Test herbicide test.

On the day preceding treatment, seeds of seven different weed species are planted in individual rows using one species per row across the width of the flat. The seeds used are hairy crabgrass (*Digitaris Sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1 percent Tween 20 (polyoxyethylene sorbitan monolaurate). The following day each flat is sprayed at the rate of 20 pounds of the candidate compound per 80 gallons of solution per acre. An atomizer is used to spray the solution on soil surface. The flats are placed in a greenhouse at 80° F. and watered regularly. Two weeks later, the degree of weed control is determined by comparing the amount of germination and growth of each weed in the treated flats with weeds in several untreated control flats. The rating system is as follows:

0 = no significant injury (0–10 percent control)
3 = slight injury (10–40 percent control)
6 = moderate injury (40–70 percent control)
9 = severe injury or death (70–100 percent control)

An activity index is used to represent the total activity on all seven weed species. It is the sum of the numbers divided by 3, so that an activity index of 21 represents complete control of all seven weeds. The results of this test are reported in Table II.

Post-Emergence Herbicide Test herbicide test.

Seeds of five weed species including hairy crabgrass, watergrass, wild oats, Indian mustard, and curly dock and one crop pinto beans (*Phaseolus vulgaris*), are planted in flats as described above for pre-emergence screening. The flats are placed in the greenhouse at 72°85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1 percent Tween 20 (polyoxy-ethylene sorbitan monolaurate) and then adding 5 ml. of water. The solution is sprayed on the foliage using an atomizer. The spray concentration is 0.5 percent and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury levels are made and recorded 14 days after treatment. The rating system is the same as described above for the pre-emergence test where (0), (3), (6) and (9) are used for the different levels of injury and control. The injury symptoms are also recorded. The maximum activity index for complete control of all the species in the post-emergence screening test is 18 which represents the sum of the rating numbers obtained with the six plant species used in the test divided by 3. The herbicide activity indices are shown in Table II.

TABLE II

| Compound No. | SCREENING RESULTS | |
|---|---|---|
| | Pre-emergence | Post-emergence |
| 1 | 10 | 6 |
| 2 | 16 | 9 |
| 3 | 18 | 9 |
| 4 | 21 | 18 |
| 5 | 17 | 12 |
| 6 | 17 | 9 |
| 7 | 16 | 11 |
| 8 | 18 | 16 |

What is claimed is:

1. The method of controlling undesirable vegetation comprising applying to the locus where control is desired an herbicidally effective amount of a compound having the generic formula

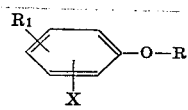

wherein R is selected from the group consisting of propynyl and butynyl; $R_1$ is selected from the group consisting of propynoxy and butynoxy; X is selected from the group consisting of hydrogen, methyl, propynoxy, chlorine and bromine.

2. The method as set forth in claim 1 wherein R is $CH_2C \equiv CCH_3$, $R_1$ is 4-$OCH_2C \equiv CCH_3$ and X is H.

3. The method as set forth in claim 1 wherein R is $CH_2C \equiv CH$, $R_1$ is 4-$OCH_2C \equiv CH$ and X is 2,3,5-$CH_3$.

4. The method as set forth in claim 1 wherein R is $CH_2C \equiv CH$, $R_1$ is 2-$OCH_2C \equiv CH$ and X is 3-$OCH_2C \equiv CH$.

5. The method as set forth in claim 1 wherein R is $CH_2C \equiv CH$, $R_1$ is 3-$OCH_2C \equiv CH$ and X is 4-Cl.

6. The method as set forth in claim 1 wherein R is $CH_2C \equiv CH$, $R_1$ is 3-$OCH_2C \equiv CH$ and X is 2-$CH_3$.

7. The method as set forth in claim 1 wherein R is $CH_2C \equiv CH$, $R_1$ is 4-$OCH_2C \equiv CH$ and X is 2-Cl.

8. The method as set forth in claim 1 wherein R is $CH_2C \equiv CH$, $R_1$ is 4-$OCH_2C \equiv CH$ and X is 2-Br.

9. The method as set forth in claim 1 wherein R is $CH_2C \equiv CH$, $R_1$ is 3-$OCH_2C \equiv CH$ and X is 4-Br.

* * * * *

PO-1050
(5/69)

UNITED STATES PATENT OFFICE
CERTIFICATE OF CORRECTION

Patent No. 3,816,091          Dated June 11, 1974

Inventor(s) Alexander Mihailovski et al.

It is certified that error appears in the above-identified patent and that said Letters Patent are hereby corrected as shown below:

On Page 1, the title should read ---ARYL ACETYLENE ETHERS---.

On Page 1, in the patent heading, the phrase ---assignor to Stauffer Chemical Company, New York, N. Y. -- should be added.

In Column 1, line 54, the word "other" should read ---ether---.

In Column 2, line 23, the heading "Pre-Emergence Herbicide Test herbicide test" should read ---Pre-Emergence Herbicide Test---.

In Column 2, line 60, the heading "Post-Emergence Herbicide Test herbicide test" should read ---Post-Emergence Herbicide Test---.

In Column 2, line 66, the figures reading "72°85°F" should read ---72°-85°F---.

Signed and sealed this 19th day of November 1974.

(SEAL)
Attest:

McCOY M. GIBSON JR.
Attesting Officer

C. MARSHALL DANN
Commissioner of Patents